Patented June 5, 1951

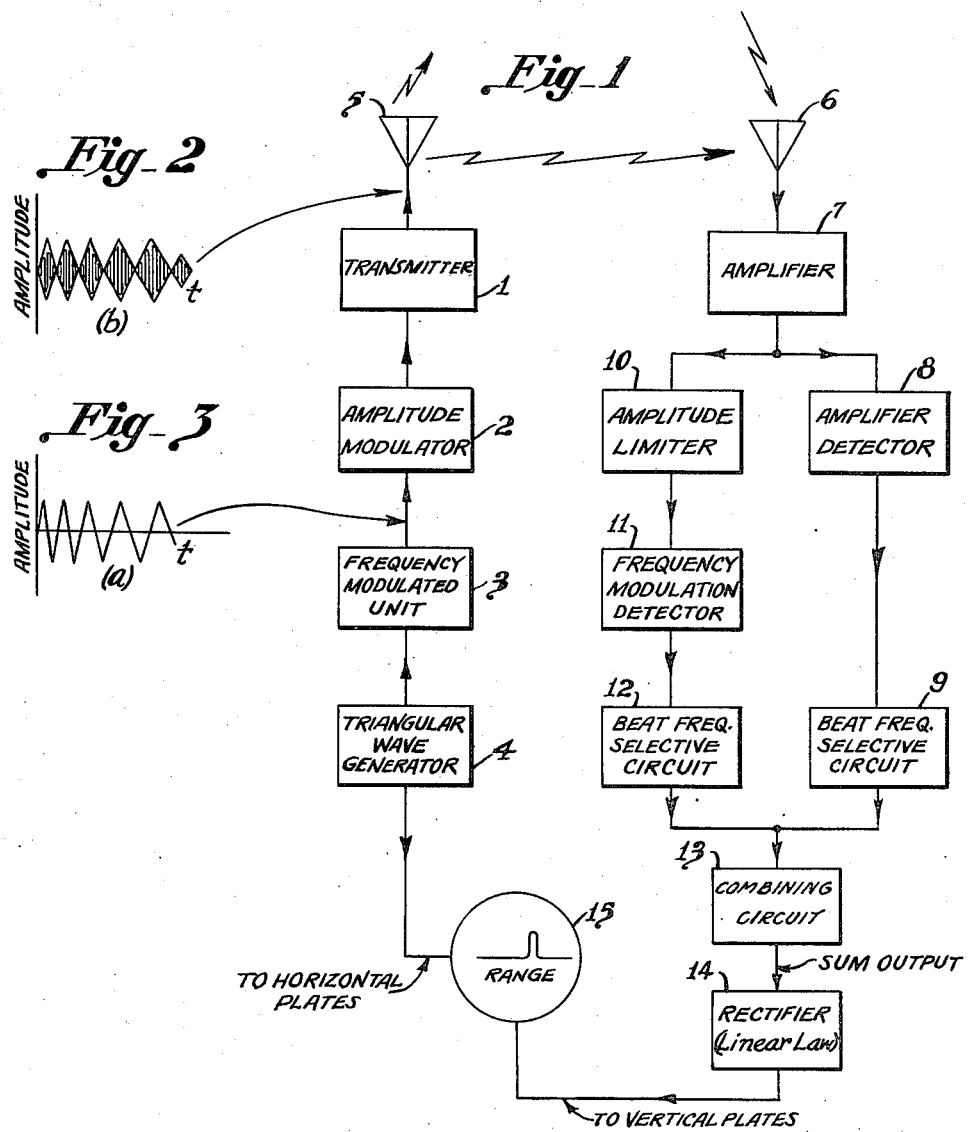

2,556,109

UNITED STATES PATENT OFFICE 2,556,109

RADIO DISTANCE MEASURING AND LIKE SYSTEM

Noël Meyer Rust and Percy Samuel Brandon, Chelmsford, England, assignors, by mesne assignments, to Radio Corporation of America, New York, N. Y., a corporation of Delaware Application July 18, 1947, Serial No. 761,858
In Great Britain October 12, 1945

Section 1, Public Law 690, August 8, 1946
Patent expires October 12, 1965

6 Claims. (Cl. 343—12)

This invention relates to radio distance measuring, radio location and detection arrangements i. e. to so-called radar systems, and has for its object to provide improved radar systems operating with continuous waves as distinct from wave pulses.

The radar systems which were widely used for military purposes during the World War of 1939–1945 and are now becoming generally known, were of the pulsed radar type. In a pulsed radar system a transmitter sends out, at a predetermined pulse repetition frequency, a sequence of substantially rectangular pulses of fixed, very high frequency energy. These pulses, after reflection from an aircraft or other radio reflecting object, are picked up by a suitable receiver and the range of the object determined by observing with the aid of a cathode ray tube and suitably associated circuits, the time taken by the radio energy to travel from the transmitting aerial to the object and thence back to the receiving aerial (commonly the same aerial as is employed for transmission). A pulsed radar system requires however, the use of a receiver of wide acceptance band width and this involves that the receiver will also be responsive to a great deal of noise which would be rejected by a receiver of narrow acceptance band width. Moreover the generation, transmission and reception of wave pulses involves many technical difficulties resulting in circuit complexity and costly apparatus and limiting the mean power which can be employed to a value well below that which is possible, in otherwise similar circumstances, with a continuous wave transmission.

For the foregoing and other reasons the production of a Radar system operating with continuous waves instead of wave pulses, and capable of giving a practical performance comparable with that of a modern pulsed radar system is much to be desired. An example of an improved radar system operating with continuous waves is described in copending application Serial No. 452,990, filed July 31, 1942, in the name of Irving Wolff, now Patent No. 2,422,157, issued June 10, 1947.

In systems in accordance with the invention contained in the Wolff application, referred to, frequency modulated wave energy is transmitted to and reflected from a target and, at the receiver, the reflected energy (or energy derived therefrom) is mixed with energy then being transmitted (or energy derived therefrom) to produce beat frequency energy, frequency selective means being provided for selecting among the beat frequencies produced and means also being provided for causing relative variation of the selected beat frequency and the rate of change of transmitted frequency to ascertain the range of a reflecting target. The basic fact underlying these inventions is that the beat frequency produced with reflection from a target at a given range is dependent upon the rate of change of frequency of the transmitted wave, or, in other words, the range of an echo which will give rise to a particular pre-determined beat frequency depends upon said rate of change. If, therefore, the rate of change of frequency of the transmitted wave is varied, a frequency selective circuit of fixed frequency receiving beat energy will produce output only as a result of received reflected energy from a given ascertainable range. Similarly if the rate of change of frequency of the transmitted wave is kept constant and the frequency to which the selective circuit is selective is varied, an output will again only be obtained at any setting of the selective circuit as a result of received reflected energy from a given ascertainable range appropriate to that particular setting.

In practice, however, in the present state of the art technical difficulties are sometimes encountered in providing satisfactory means for producing the required frequency modulation of the transmitted continuous waves at the necessary power levels and at the frequencies required in certain cases. On the other hand, there are readily available amplitude modulating systems, e. g. those used in television transmission, which will not only handle high powers but will also permit of the use of very high modulating frequencies without appreciable loss of side-band energy. The present invention seeks to take advantage of this fact to avoid the practical difficulties above referred to.

According to present invention a radar system wherein a continuous wave (as distinct from a pulsed wave) is transmitted and wherein received reflected energy (or energy derived therefrom) is mixed with energy then being transmitted (or energy derived therefrom) is characterized in that the transmitted wave is amplitude modulated by a modulating signal which itself is frequency modulated and, at the receiver, the resultant mixed wave is subjected to amplitude demodulation and frequency demodulation in separate channels whose outputs are combined.

A preferred radar system in accordance with the invention comprises means for transmitting continuous wave energy which is amplitude modulated by a modulating signal which is itself frequency modulated, and a receiver for receiving reflected transmitted energy and energy then being transmitted said receiver having two channels one including an amplitude modulation detector and the other including a frequency-modulation detector, the outputs from these channels, which are beat frequency outputs, being fed each to a beat frequency selective circuits the outputs from which are passed to a final detector.

The invention is illustrated in the accompanying drawings in which Fig. 1 is a block diagram of one embodiment of the invention and Figs. 2 and 3 graphs that are referred to in explaining the invention.

Referring to the drawings the system therein represented comprises an amplitude-modulated transmitter 1 controlled by an amplitude modulator 2 providing transmitter 1 with a frequency modulated wave of constant amplitude which modulates the transmitter in amplitude. The frequency of this modulation input is varied between lower and upper limits in accordance by a frequency modulator 3 with any suitable law, such, for example, as a triangular law. The lower limit of frequency is chosen higher than the highest beat frequency which will result from mixing in the receiver portion of the system (this will be described later) and the upper limit is chosen in dependence upon practical design and operating considerations, notably considerations of linearity of frequency swing and required resolution of range measurement in the system. For example, the frequency of the wave at 3 may be caused to vary between one hundred kilocycles and two megacycles, in accordance with a linear triangular law. Such a modulation input could be handled quite satisfactorily by a transmitter of general construction like that of a modern television transmitter and would permit of the obtaining of a range discrimination of the order of one hundred and fifty meters. As shown, the frequency modulated unit 3 is controlled by a wave provided by a time base generator 4 providing a triangular control wave so that the output from the frequency modulated unit 3 is as represented graphically at $a$ where the frequency of the wave varies with time $t$. The resultant transmitted envelope from the transmitting aerial 5 is represented at $b$ where amplitude is plotted against time $t$. Preferably the transmitter carrier from transmitter 1 is amplitude-modulated by the frequency-modulated modulating wave to 100 percent over the whole range of the frequency modulation.

The receiving portion of the system includes a sharply directional aerial system 6 (though for the sake of simplicity in drawing both transmitting and receiving aerials 5 and 4 are shown in open aerials, directional aerials or a common directional aerial may be used in accordance with present day radar practice) weakly coupled to the input side of an amplifier 7 which is tuned to the carrier frequency from 1 and has a pass band of sufficient width to accommodate the side-bands necessary to convey the modulation. The directly fed wave from 1 and the wave received therefrom after reflection from a target are both present in the amplifier 7 the output from which is fed to two channels with parallel inputs. One channel includes an amplitude modulation detector system 8 of the usual rectifying kind followed by a beat-frequency selective circuit 9, and the second channel includes an amplitude limiter or limiting amplifier 10, followed by a frequency modulation detector circuit 11 of known kind in turn followed by a beat-frequency selective circuit 12. The outputs from the beat-frequency selective circuits 9, 12 in the two channels are combined additively in correct proportions in an adding or combining circuit and beat frequency amplifier 13 and the resultant sum is detected by a rectifier 14 of linear law. The correct proportioning of the two outputs in the combination may be obtained by trial and error by adjusting one or the other of two potentiometers (not shown) provided across the output terminals of units 9 and 12 and feeding into the combining circuit at 13. The output of the rectifier is applied to a suitable indicator; for example, it may be applied to the vertical deflection members of a cathode ray tube 15, to the horizontal deflection members of which are applied an electrical quantity which is representative of the rate of change of frequency of the frequency-modulated modulating wave. As indicated, the vertical deflection system of the tube 15 is operated by the output from the rectifier 14 while the horizontal deflection system is operated by a second output from the time base circuit 4.

As already stated the aerial 6 receives wave energy direct from aerial 1 and also receives energy therefrom after reflection from a target. If the direct and reflected waves are in phase or in anti-phase in the unit 7 the amplitude modulation detector 8 will demodulate, not only each carrier separately, but also beats between the demodulation envelopes; in other words, the arrangement will behave, insofar as the demodulation envelopes are concerned, as if the frequency-modulated modulating wave had itself been radiated. Of course, the in-phase or anti-phase condition will arise only in respect of certain objects in the range of distances explored. Thus considering a particular object situated at a distance which produced an in-phase condition, this object if moved through a distance equal to one quarter of a wave-length will produce the anti-phase condition. (Moving the object through a quarter of a wave-length is, of course, equivalent to lengthening the transit path, between transmitter to reflector and back to receiver by half a wave-length.) If, however, the two waves under consideration are in phase-quadrature, as would be the case if the object were moved through a distance equal to one eighth of a wave-length from the position which produced an in-phase or an anti-phase condition, the amplitude modulation detector 8 will produce no significant output but the frequency modulation detector system will produce a clear beat.

The beat frequency selective circuits 9, 12 in the two channels may be fixed tuned, in which case the rate-of-change of the frequency-modulated modulating wave would be varied, for example, by way of the methods described in the above-mentioned Wolff application.

Alternatively they may be variably tunable in which case the rate of change of the frequency modulated modulating wave would remain substantially constant, and the combining circuit incorporated in unit 13 would be arranged to combine the outputs from 9 and 12 in a varying ratio so that the practical difficulty, that the efficiency of either the amplitude detector or the frequency detector taken by itself would be dependent upon the range of the object in relation to the wavelength, is overcome; the two outputs from 9 and 12 being combined in such a manner that that combined output is substantially independent of small changes of range e. g. changes of the order of an eighth of a wavelength.

It will be seen that in the system described the carrier, in effect, carries frequency modulation intelligence on an amplitude modulated wave, so that the methods described in the Wolff application referred to, Doppler effect methods of measuring relative line-of-sight velocity, and so on become applicable at high radiated powers. By suitably controlling the outputs of the two channels (the amplitude modulation detector and the frequency modulation detector channels) the system can be made very critical to small displacements of frequency, and hence suitable for application to systems in which discrimination between fixed and moving objects is required.

In the illustrated arrangement the direct and reflected waves are received on the aerial 6 but obviously the direct wave could be fed to a suitable circuit in the receiver via a galvanic connection which could include, if desired, an adjustable attenuator or coupling. Obviously also the direct and reflected waves could, if desired, be changed in frequency before being mixed in the receiver input channel.

We claim as our invention:

1. A continuous wave radar system comprising means for transmitting continuous wave energy which is amplitude modulated by a modulating signal which is itself frequency modulated and a receiver for receiving reflected transmitted energy and energy then being transmitted, said receiver having two channels each including a beat frequency selective circuit, one of said channels including an amplitude modulation detector and the other of said channels including a frequency-modulation detector, the outputs from these detectors, which are beat frequency outputs, being fed to said beat frequency selective circuits, respectively, a final detector, and means for supplying the outputs of said beat frequency selective circuits to said final detector.

2. A system as claimed in claim 1 comprising, in the transmitting portion thereof, a time base circuit arrangement, a source of constant amplitude frequency modulated waves controlled in frequency by said time base arrangement, a source of amplitude modulation waves controlled in amplitude by the frequency modulated waves and means for transmitting the amplitude modulated waves; and, in the receiving portion thereof, a common channel for reflected wave energy and wave energy derived directly from the transmitter, an amplitude demodulator fed from said common channel, a frequency demodulator fed from said common channel, a beat frequency selective circuit fed from the amplitude demodulator, a beat frequency selective circuit fed from the frequency demodulator, a circuit for combining the outputs from the beat frequency selective circuits, a rectifier fed from the last mentioned circuit, and an indicating oscillograph receiving one deflecting input from said rectifier and a coordinate deflecting input constituted by an electrical quantity representative of the rate of change of frequency of the frequency modulated wave.

3. A system as claimed in claim 2 wherein the coordinate deflecting input is taken from the time base circuit arrangement.

4. A system as claimed in claim 2 wherein the beat frequency seelctive circuits are of fixed frequency and the rate of change of the frequency modulated modulating wave is varied.

5. A system as claimed in claim 2 wherein the beat frequency selective circuits are of variable frequency and the rate of change of the frequency modulated modulating wave is fixed.

6. A continuous wave radar system comprising a transmitter and a receiver, said transmitter comprising means for producing a radio wave, means for producing a modulating signal, means for frequency modulating said modulating signal, means for amplitude modulating said radio wave by said frequency modulated modulating signal, means for radiating said modulated radio wave toward a reflecting object whereby a portion of the radio wave energy is reflected back to said receiver, said receiver comprising means for mixing said reflected energy or energy derived therefrom with energy received directly from the transmitter or with energy derived from said directly received energy, said receiver further comprising means for frequency demodulating the resultant mixed wave in one channel, means for amplitude demodulating said resultant mixed wave in a separate channel, and means for combining the resulting outputs of said two channels.

NOËL MEYER RUST.
PERCY SAMUEL BRANDON.

REFERENCES CITED

The following references are of record in the file of this patent:

UNITED STATES PATENTS

| Number | Name | Date |
| --- | --- | --- |
| 2,233,183 | Roder | Feb. 25, 1941 |

FOREIGN PATENTS

| Number | Country | Date |
| --- | --- | --- |
| 541,665 | Great Britain | Dec. 5, 1941 |